(12) United States Patent
Kompella

(10) Patent No.: US 8,218,553 B2
(45) Date of Patent: Jul. 10, 2012

(54) LOAD BALANCING NETWORK TRAFFIC ON A LABEL SWITCHED PATH USING RESOURCE RESERVATION PROTOCOL WITH TRAFFIC ENGINEERING

(75) Inventor: Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 546 days.

(21) Appl. No.: 12/507,200

(22) Filed: Jul. 22, 2009

(65) Prior Publication Data
US 2010/0214913 A1 Aug. 26, 2010

Related U.S. Application Data

(60) Provisional application No. 61/155,356, filed on Feb. 25, 2009.

(51) Int. Cl.
*H04L 12/56* (2006.01)
(52) U.S. Cl. ...................... 370/395.5; 370/469
(58) Field of Classification Search .................. 370/230, 370/230.1, 389, 390, 395.1, 396, 395.5, 400, 370/469
See application file for complete search history.

(56) References Cited

U.S. PATENT DOCUMENTS

| | | | |
|---|---|---|---|
| 4,199,663 A | 4/1980 | Herzog | |
| 6,091,725 A | 7/2000 | Cheriton et al. | |
| 6,118,760 A | 9/2000 | Zaumen et al. | |
| 6,243,667 B1 | 6/2001 | Kerr et al. | |
| 6,553,005 B1 | 4/2003 | Skirmont et al. | |
| 6,651,099 B1 | 11/2003 | Dietz et al. | |
| 6,909,713 B2 | 6/2005 | Magnussen et al. | |
| 6,980,550 B1 | 12/2005 | Yip et al. | |
| 7,206,861 B1 | 4/2007 | Callon | |
| 7,277,386 B1 * | 10/2007 | Ferguson et al. | 370/230 |
| 7,633,871 B1 | 12/2009 | Callon | |
| 7,808,898 B2 | 10/2010 | Eswaran et al. | |
| 8,107,363 B1 * | 1/2012 | Saluja | 370/228 |
| 2001/0043585 A1 | 11/2001 | Hummel | |
| 2003/0137971 A1 * | 7/2003 | Gibson et al. | 370/351 |
| 2003/0231628 A1 | 12/2003 | Harada et al. | |
| 2004/0013113 A1 | 1/2004 | Singh et al. | |
| 2004/0258073 A1 | 12/2004 | Alexander et al. | |
| 2005/0160171 A1 | 7/2005 | Rabie et al. | |
| 2005/0169266 A1 * | 8/2005 | Aggarwal et al. | 370/389 |
| 2006/0098587 A1 | 5/2006 | Vasseur et al. | |
| 2006/0182035 A1 | 8/2006 | Vasseur | |
| 2007/0109015 A1 | 5/2007 | Hanes et al. | |

(Continued)

OTHER PUBLICATIONS

Extended European Search Report from European application No. EP 10151477, dated Apr. 12, 2010, 5 pp.
Viswanathan et al., "Evolution of Multiprotocol Label Switching," IEEE Communications Magazine, May 1998, pp. 165-173.

(Continued)

*Primary Examiner* — Ricky Ngo
*Assistant Examiner* — Eric Kao
(74) *Attorney, Agent, or Firm* — Shumaker & Sieffert, P.A.

(57) ABSTRACT

Techniques are describe for establishing an overall label switched path (LSP) for load balancing network traffic being sent across a network using the a resource reservation protocol such as Resource Reservation Protocol with Traffic Engineering (RSVP-TE). The techniques include extensions to the RSVP-TE protocol that enable a router to send Path messages for establishing a tunnel that includes a plurality of sub-paths for the overall LSP. The tunnel may comprise a single RSVP-TE Label Switched Path (LSP) that is configured to load balance network traffic across different sub-paths of the RSVP-TE LSP over the network.

28 Claims, 9 Drawing Sheets

U.S. PATENT DOCUMENTS

2007/0248084 A1  10/2007  Whitehead
2008/0126565 A1  5/2008   Osano et al.
2008/0219258 A1  9/2008   Bowen et al.
2010/0024008 A1  1/2010   Hopen et al.

OTHER PUBLICATIONS

U.S. Appl. No. 11/677,317, filed Feb. 21, 2007, entitled "Network Traffic Distribution Across Parallel Paths," Callon.

* cited by examiner of# LOAD BALANCING NETWORK TRAFFIC ON A LABEL SWITCHED PATH USING RESOURCE RESERVATION PROTOCOL WITH TRAFFIC ENGINEERING This application claims the benefit of U.S. Provisional Application No. 61/155,356, filed Feb. 25, 2009, the entire content of which is incorporated by reference herein.

TECHNICAL FIELD

The invention relates to computer networks and, more particularly, to engineering traffic flows within computer networks.

BACKGROUND

The term "link" is often used to refer to the connection between two devices on a computer network. The link may be a physical medium, such as a copper wire, a coaxial cable, any of a host of different fiber optic lines or a wireless connection. In addition, network devices may define "virtual" or "logical" links, and map the virtual links to the physical links. As networks grow in size and complexity, the traffic on any given link may approach a maximum bandwidth capacity for the link, thereby leading to congestion and loss.

Multi-protocol Label Switching (MPLS) is a mechanism used to engineer traffic patterns within Internet Protocol (IP) networks. By utilizing MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

A variety of protocols exist for establishing LSPs. For example, one such protocol is the label distribution protocol (LDP). Procedures for LDP by which label switching routers (LSRs) distribute labels to support MPLS forwarding along normally routed paths are described in RFC 3036, "LDP Specification," Internet Engineering Task Force (IETF), hereby incorporated by reference. Another type of protocol is a resource reservation protocol, such as the Resource Reservation Protocol with Traffic Engineering extensions (RSVP-TE). RSVP-TE uses constraint information, such as bandwidth availability, to compute and establish LSPs within a network. RSVP-TE may use bandwidth availability information accumulated by a link-state interior routing protocol, such as the Intermediate System-Intermediate System (ISIS) protocol or the Open Shortest Path First (OSPF) protocol. RSVP-TE establishes LSPs that follow a single path from an ingress device to an egress device, and all network traffic sent on the LSP must follow exactly that single path. The use of RSVP (Resource Reservation Protocol), including extensions to establish LSPs in MPLS are described in RFC 3209, IETF, December 2001, hereby incorporated by reference.

SUMMARY

In general, the invention is directed toward techniques for load balancing network traffic being sent across a network using a resource reservation protocol that allows label switched paths (LSPs) having reserved bandwidth to be established, such as Resource Reservation Protocol with Traffic Engineering (RSVP-TE). The techniques include extensions to the RSVP-TE protocol that enable a router to send RSVP Path messages for establishing a tunnel that includes a plurality of sub-paths. The tunnel may comprise a single RSVP-TE LSP that is configured to load balance network traffic across different sub-paths of the RSVP-TE LSP over the network.

The techniques include extensions to the RSVP-TE protocol that enable routers to establish a new kind of traffic-engineered LSP, referred to herein as a load balancing traffic-engineered (TE) LSP. As described herein the load balancing TE LSP is a single LSP formed so as to contain a number of sub-paths across which traffic is load balanced. At each hop along the LSP, the node (i.e., LSR) may bifurcate out the path or sub-path into multiple sub-paths, each traversing alternate routes to the destination of the LSP. In selecting the sub-paths while establishing the overall load balancing TE LSP, each node ensures each sub-path meets the traffic-engineering constraints of the traffic-engineered LSP, such as bandwidth, link colors, Shared Risk Link Group (SRLG), and the like. A given node may divide some constraints, such as bandwidth, across the sub-paths so as to meet an overall constraint for the LSP. A node that is a "merge point" for multiple sub-paths of the traffic-engineered LSP is responsible for requesting downstream path(s) that account for the total of the bandwidths required by each of the sub-paths that merge at that node. Further, each of the nodes in the load balancing TE LSP is configured to load balance traffic across the sub-paths of the load balancing TE LSP that emerge from the node.

After the load balancing TE LSP is established, a node along the TE LSP that receives network traffic destined (e.g., MPLS network traffic) for the egress of the TE LSP implements flow-level load balancing to allocate the traffic among the sub-paths downstream of the node. For example, the node may split the traffic using a flow-based hash function so as to allocate packets of the same packet flow to the same sub-path, yet provide a degree of load balancing across the sub-paths. If one packet flow begins using more than its share of bandwidth, the node may adjust a flow hash map to reallocate the packet flows across the sub-paths. In this manner, network traffic from the ingress to the egress is load balanced across sub-paths of the load balancing TE LSP such that all sub-paths of the TE LSP are roughly equally utilized.

A TE LSP that carries unicast traffic usually starts at one node (the ingress), and ends at another node (the egress). A load-balancing TE LSP can have multiple egresses, if these egress nodes are deemed equivalent for the traffic that the LSP carries. That is, there may be a number of equally valid egresses for a unicast LSP. A network device configured with the techniques described herein for load-balancing LSPs can compute multiple paths to the various egresses and balance the traffic across both sub-paths and egresses. Note that a given packet entering the load-balancing TE LSP at the ingress node traverses exactly one sub-path of the LSP, and thus arrives at exactly one egress node. This distinguishes load-balancing LSPs from multicast (point-to-multipoint) LSPs.

In other embodiments, devices may be configured to form load-balancing point-to-multipoint (P2MP) LSPs. In these examples, traffic may be load balanced across an overall P2MP LSP.

The techniques may provide one or more advantages. For example, the techniques may allow devices within the network to make better use of the available bandwidth on various paths across the network. For example, instead of creating multiple independent LSPs between the same pair of endpoints and then trying to statically distribute traffic among these independent LSPs, the techniques establish a single RSVP-TE LSP between a pair of endpoints having sub-paths on which the nodes in the LSP will load balance traffic. This approach using load balancing makes more effective use of available bandwidth than an approach that would require classifying traffic into pre-defined "buckets." In addition, the techniques described herein may reduce the amount of state needed to be maintained in the network, because the techniques would establish a single RSVP-TE LSP between a pair of endpoints rather than multiple independent LSPs between the same pair of endpoints. Furthermore, if a given node has multiple downstream sub-paths and an outage or other network failure (e.g., a link or node failure) occurs in one of the sub-paths, the given node can simply rebalance traffic among the remaining sub-paths, thus quickly and efficiently dealing with the failure. Load-balancing LSPs may therefore provide improved network resilience, without requiring dedicated links just for failure cases.

In one embodiment, a method for traffic-engineering an overall label switched path (LSP) across a network from an ingress device to an egress device comprises computing for the LSP a plurality of sub-paths to the egress device that satisfy a set of traffic-engineering constraints, and sending resource reservation requests to label-switching routers (LSRs) along two or more of the plurality of sub-paths of the overall LSP, wherein the resource reservation requests include an identifier associating the requests with the same overall LSP, and wherein the resource reservation requests each include an indicator specifying the requested overall LSP as a load-balancing LSP. The method also includes receiving resource reservation messages in response to the resource reservation requests that specify reserved resources and labels allocated to the overall LSP to be used for forwarding network traffic to corresponding next hops along the sub-paths of the overall LSP, wherein the resource reservation messages include an identifier associating the messages with the same overall LSP, and wherein the resource reservation messages each include an indicator specifying the overall LSP as a load-balancing LSP, configuring a forwarding plane of the network device to store the labels and corresponding next hops for the sub-paths of the overall LSP, and configuring the forwarding plane with load balancing requirements that specify how network traffic is to be load-balanced across the sub-paths of the overall LSP. The method further includes receiving network traffic at the ingress device of the overall LSP, and, in the forwarding plane of the ingress device, load balancing the network traffic across the sub-paths by selecting from among the stored labels and corresponding next hops for forwarding the network traffic in accordance with load balancing requirements; as well as forwarding the network traffic with the selected labels onto sub-paths of the overall LSP.

In another embodiment, a router comprises a control unit configured to execute a resource reservation protocol for traffic-engineering an overall LSP across a network from an ingress device to an egress device, wherein the resource reservation protocol is configured to compute for the LSP a plurality of alternate sub-paths to the egress device that satisfy the set of traffic-engineering constraints, and a physical interface configured to send resource reservation requests generated by the resource reservation protocol to LSRs along two or more of the plurality of sub-paths of the overall LSP, wherein the resource reservation requests include an identifier associating the requests with the same overall LSP, and wherein the resource reservation requests each include an indicator specifying the requested overall LSP as a load-balancing LSP, and receive resource reservation messages in response to the resource reservation requests that specify reserved resources and labels allocated to the overall LSP to be used for forwarding network traffic to corresponding next hops along the sub-paths of the overall LSP, wherein the resource reservation messages include an identifier associating the messages with the same overall LSP, and wherein the resource reservation messages each include an indicator specifying the overall LSP as a load-balancing LSP. The router includes a forwarding plane configured to store the labels and corresponding next hops for the sub-paths of the overall LSP, wherein the resource reservation protocol configures the forwarding plane with load balancing requirements that specify how network traffic is to be load-balanced across the sub-paths of the overall LSP, and a load balancing module executing on the forwarding plane, wherein the load balancing module is configured to load balance the network traffic across the sub-paths by selecting from among the stored labels and corresponding next hops for forwarding the network traffic in accordance with load balancing requirements. The interface is configured to forward the network traffic with the selected labels onto sub-paths of the overall LSP.

In another embodiment, a computer-readable storage medium comprises instructions for causing a programmable processor to execute a resource reservation protocol for traffic-engineering an overall LSP across a network from an ingress device to an egress device, compute for the LSP a plurality of alternate sub-paths to the egress device that satisfy a set of traffic-engineering constraints, send resource reservation requests to LSRs along two or more of the plurality of sub-paths of the overall LSP, wherein the resource reservation requests include an identifier associating the requests with the same overall LSP, and wherein the resource reservation requests each include an indicator specifying the requested overall LSP as a load-balancing LSP. The instructions also cause the programmable processor to receive resource reservation messages in response to the resource reservation requests that specify reserved resources and labels allocated to the overall LSP to be used for forwarding network traffic to corresponding next hops along the sub-paths of the overall LSP, wherein the resource reservation messages include an identifier associating the messages with the same overall LSP, and wherein the resource reservation messages each include an indicator specifying the overall LSP as a load-balancing LSP. The instructions also cause the programmable processor to configure a forwarding plane of a network device to store the labels and corresponding next hops for the sub-paths of the overall LSP, and configure the forwarding plane to apply flow-level load balancing to the received network traffic to load balance the packet flows across the sub-paths of the overall LSP by selecting from among the stored labels and corresponding next hops for forwarding the packet flows in accordance with load balancing requirements.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
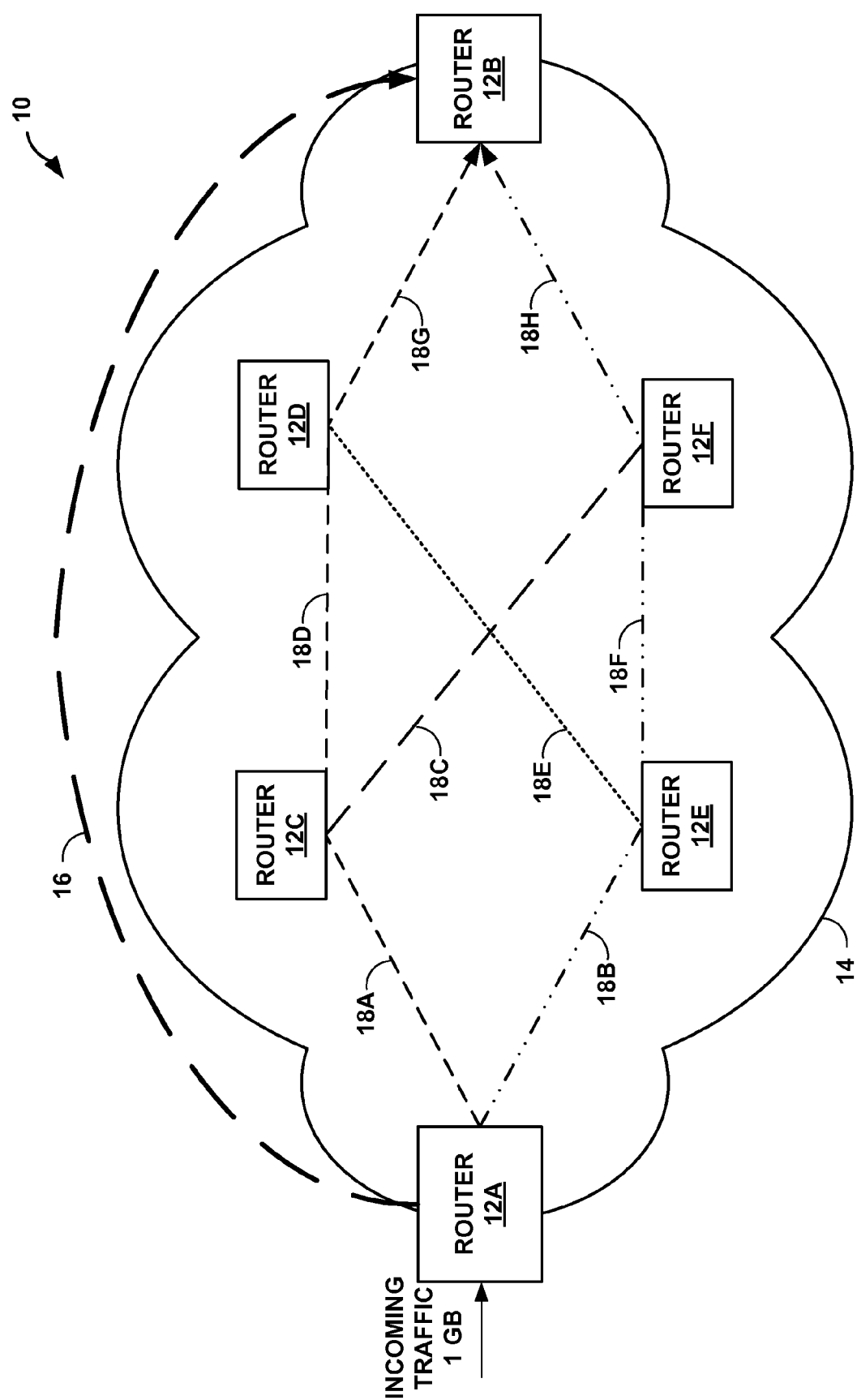
FIG. 1 is a block diagram illustrating an exemplary computer network having a load balancing TE LSP established over the network between an ingress router and an egress router.

FIG. 1 is a block diagram illustrating a system 10 that includes an exemplary computer network 14 having a load balancing traffic-engineered tunnel 16 established over the network 14 between an ingress router 12A and an egress router 12B. For example, tunnel 16 may comprise a Resource Reservation Protocol with Traffic Engineering (RSVP-TE) Label Switched Path (LSP). In the example of FIG. 1, routers 12A-12F ("routers 12") use a modified RSVP-TE protocol that has been extended to establish a load balanced TE tunnel 16 that extends from ingress router 12A to egress router 12B. When routers 12 receive network traffic, tunnel 16 is configured on routers 12 so as to allow routers 12 to load balance traffic across sub-paths 18A-18H ("sub-paths 18") of the tunnel 16. In this way, tunnel 16 may be viewed as a point-to-point tunnel between a single ingress and a single egress that is constructed to contain multiple, intermediate sub-paths used for actively load-balancing the MPLS traffic associated with the tunnel. In some embodiments, tunnel 16 may be formed as a point-to-multipoint (P2MP) LSP providing a P2MP tunnel from a single ingress to a plurality of destinations, where intermediate (P2MP) sub-paths may be used for actively load-balancing the MPLS traffic to any of the destinations. In such a load balancing P2MP LSP, at any node, exactly one of a plurality of sub-paths is chosen for a given packet; however, if that sub-path has multiple downstream neighbors, the packet is replicated across those downstream neighbors. Extensions to RSVP-TE for the setup of P2MP LSPs in MPLS and Generalized MPLS (GMPLS) networks are described in "Extensions to RSVP-TE for Point to Multipoint TE LSPs," IETF, May 2005, hereby incorporated by reference. In another embodiment (not illustrated here), tunnel 16 may be a unicast tunnel with multiple equally valid egresses 12B. Packets are sent from ingress 12A to exactly one of these egresses 12B via one of the sub-paths 18; the distinction between this and a load-balanced P2MP tunnel is that there is no replication of traffic in the case of a unicast tunnel with multiple egresses.

Network 14 may include a greater number of routers than are shown in FIG. 1. The ultimate sources of the network traffic being load balanced may comprise one or more devices and/or any public or private network or the Internet that provides traffic to ingress router 12A in network 14. The ultimate destinations of the network traffic being load balanced may comprise one or more destination devices and/or network that may include LANs or wide area networks (WANs) that comprise a plurality of devices. For example, destination devices may include personal computers, laptops, workstations, personal digital assistants (PDAs), wireless devices, network-ready appliances, file servers, print servers or other devices that access the source via network 14.

The extensions to RSVP-TE described herein enable ingress router 12A to calculate multiple sub-paths towards egress router(s) 12B, and to send multiple RSVP Path messages for the same tunnel 16 to downstream routers along selected ones of the calculated sub-paths. Because the sub-paths are all part of the same overall LSP, i.e., tunnel 16, routers 12 may be required to store less state in network 14 than if separate LSPs were constructed for each path between router 12A and router 12B.

In response to a network administrator initiating set-up of tunnel 16 from router 12A to router 12B, ingress router 12A uses the extended RSVP-TE protocol to compute some or all of the available paths to egress router 12B that satisfy certain constraints on the tunnel imposed by the network administrator. Constraints imposed may include, for example, bandwidth, link color, Shared Risk Link Group (SRLG), and the like. For example, the network administrator may wish to configure an overall LSP that can handle 100 Megabytes of network traffic. RSVP-TE uses constraint information about links within network 14, such as bandwidth availability, to compute the paths. For example, RSVP-TE may use bandwidth availability information accumulated by a link-state interior routing protocol, such as the Intermediate System-Intermediate System (ISIS) protocol or the Open Shortest Path First (OSPF) protocol. RSVP-TE as extended herein computes multiple paths for which certain constraints, including bandwidth, provide the requisite bandwidth availability in sum. This is described in further detail in the examples below. In another embodiment, an external entity such as a Path Computation Element may compute load-balancing sub-paths that RSVP-TE can then use to establish a load-balancing LSP.

After computing the multiple paths, RSVP-TE may select a subset or all of the computed paths on which to send a corresponding Path message for establishing sub-paths of the overall tunnel 16. In contrast to conventional RSVP-TE, which selects a single path to the egress device for establishing an LSP, the RSVP-TE extended as described herein is configured to compute and select multiple paths from the ingress to the egress. Moreover, the multiple paths may themselves be divided into sub-paths by subsequent nodes along the paths, as described in further detail below. RSVP-TE may be configured with an upper limit on how many paths can be computed and/or selected.

In the example of FIG. 1, router 12A establishes sub-paths 18A and 18B towards router 12B. Router 12C divides sub-path 18A by establishing two sub-paths 18D and 18C. Router 12E divides sub-path 18B by establishing two sub-paths 18E and 18F. Router 12D is a merge point of the overall LSP that merges sub-paths 18D and 18E into a single sub-path 18G; router 12F merges sub-paths 18C and 18F into a single sub-path 18H. Sub-paths 18G and 18H extend to egress router 12B. Routers 12 may be configured to recognize a received Path message as one for establishing a load balancing TE LSP based on a special bit set in the Path message, for example, or other indicator. The manner in which routers 12 (also referred to as "nodes" or label-switching routers (LSRs)) establish the sub-paths 18 is described in further detail below.

Figure 2:
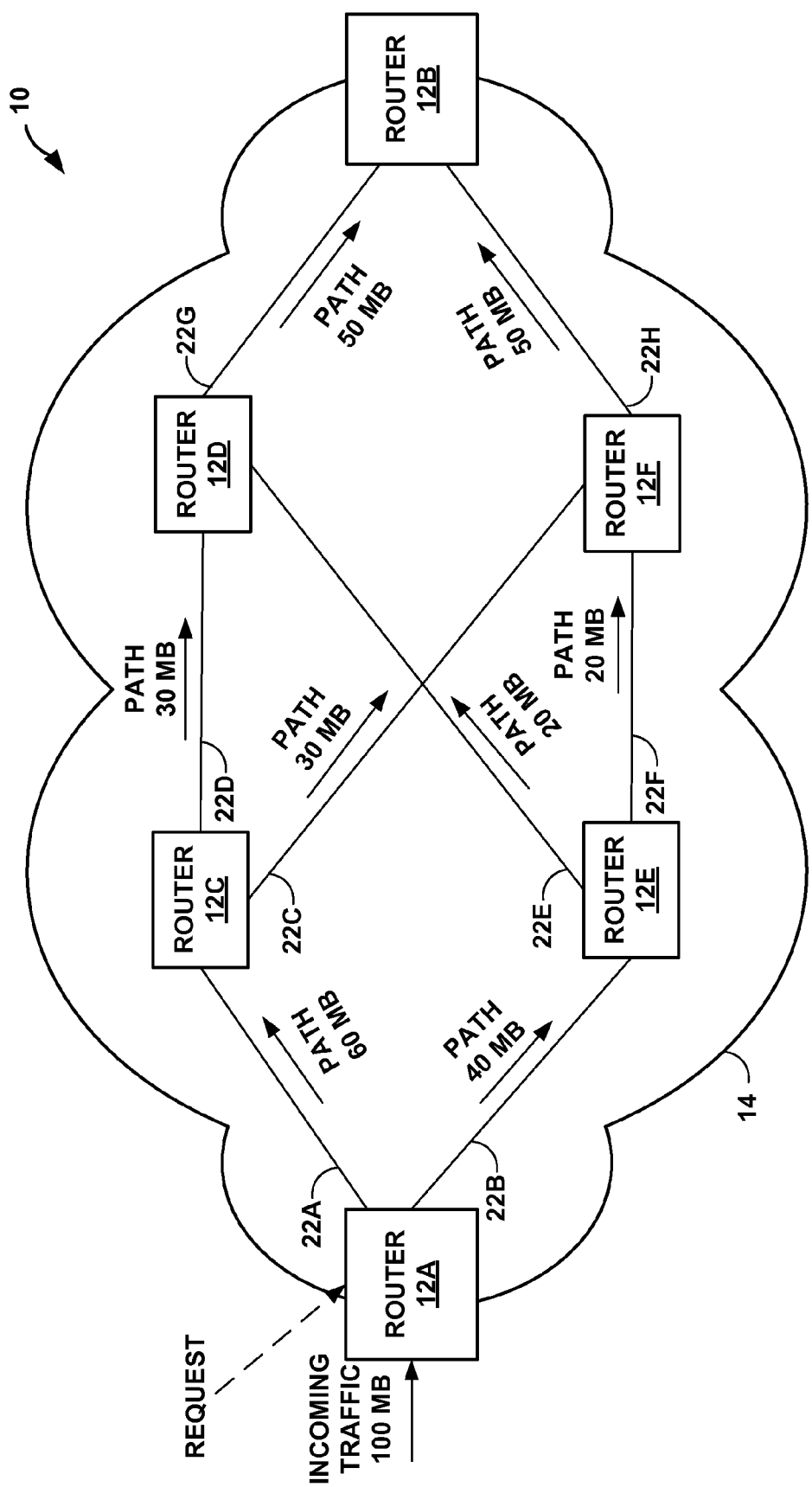
FIG. 2 is a block diagram illustrating exemplary Path messages sent by routers within the computer network for establishing the load balancing TE LSP.

FIG. 2 is a block diagram illustrating one exemplary manner in which routers 12 use RSVP-TE with load balancing extensions. As shown in FIG. 2, in response to a single request to establish an LSP from router 12A to router 12B (e.g., a request from an administrator or from another network device, such as a device upstream from router 12A), routers 12 coordinate to send multiple Path messages to establish the LSP as tunnel 16 configured for load balancing network traffic on multiple intermediate sub-paths 18 from ingress router 12A to egress router 12B. Further, router 12A is configured as the single ingress for an overall LSP tunnel 16 that, on the whole, supports certain constraint requirements specified in the request, including an overall bandwidth constraint of one hundred megabytes per second of network traffic. RSVP-TE executing on router 12A is configured to compute the paths to egress 12B using constraint information about links within network 14. The constraint information may be collected by router 12A executing a link-state protocol.

In the example of FIG. 2, in response to the request, router 12A computes a path 18A (FIG. 1) along link 22A toward router 12C that leads to the requested destination (i.e., router 12B). Router 12A also identifies a second path 18B along link 22B toward router 12E that also can be used to reach the requested destination for the LSP. At this time, based on network state data maintained by the RSVP protocol, router 12A determines the amount of bandwidth available for reservation along both paths 18A, 18B, and outputs multiple Path messages so as to establish two sub-paths that together satisfy the overall bandwidth requirements. In this example, router 12A determines that 60 Megabytes of bandwidth is available for reservation along path 18A and that 40 Megabytes of bandwidth can be reserved along path 18B. Together, paths 18A and 18B can accommodate the required total of 100 Megabytes of network traffic for the overall tunnel 16. The extended RSVP-TE protocol of router 12A selects these two paths and issues a Path message for tunnel 16 requesting a reservation of 60 Megabytes of bandwidth on link 22A and at the same time issues a second Path message for the same tunnel 16 requesting a reservation of 40 Megabytes of bandwidth on link 22B. The Path messages each include identifiers indicating that the bandwidth reservation is for the same overall LSP, and are modified over the conventional RSVP-TE protocol so that receiving routers can easily determine that Path message may be one of a plurality of Path messages sent by the upstream device for the same LSP. Router 12A may compute other paths to egress 12B, but may select only the best paths that are able to accommodate the total bandwidth requested. In some embodiments, router 12A may be configured with an upper limit on the number of paths that can be computed and/or selected.

Upon receiving the modified Path message from router 12A, the extended RSVP-TE protocol executing on router 12C may similarly compute sub-paths towards egress router 12B that together satisfy the constraint information specified in the Path message. Router 12C selects sub-paths 18D and 18C from among the computed sub-paths, and issues a first modified Path message requesting a reservation of 30 Megabytes of bandwidth on link 22D, and issues a second modified Path message requesting a reservation of 30 Megabytes of bandwidth on link 22C. The modified Path messages each indicate that the bandwidth reservation is for the same overall LSP.

Similarly, upon receiving the modified Path message from router 12A, the extended RSVP-TE protocol executing on router 12E may similarly compute sub-paths towards egress router 12B that together satisfy the constraint information specified in the modified Path message. Router 12E selects sub-paths 18E and 18F from among the computed sub-paths, and issues a first modified Path message requesting a reservation of 20 Megabytes of bandwidth on link 22E, and issues a second modified Path message requesting a reservation of 20 Megabytes of bandwidth on link 22F. The modified Path messages each indicate that the bandwidth reservation is for the same overall LSP.

Upon receiving the modified Path messages from router 12C and router 12E, the extended RSVP-TE protocol executing on router 12D examines the Path messages and, based on the LSP identifiers, determines that the multiple Path messages correspond comprise a set of Path messages for a single LSP, thereby rendering router 12D as a merge point for multiple upstream sub-paths. Router 12D may similarly compute a path towards egress router 12B that satisfies the aggregate of the constraint information specified in the set of Path messages, i.e., the Path messages received from routers 12C and 12E. In this example, router 12D selects path 18G and issues a single Path message to router 12B requesting a reservation of 50 Megabytes of bandwidth on link 22G, i.e., the sum of the requested bandwidth from the two Path messages that it received for the two upstream sub-paths that merge at router 12D. The modified Path message sent by router 12D indicates that the Path message may be one of a set of Path messages for tunnel 16. This allows router 12B to similarly determine that it is a merge-point for the tunnel 16, and that the Path messages from routers 12D, 12F can be viewed as requests for sub-paths of an overall LSP for which router 12B provides a single point of exit as the egress for the tunnel.

In some cases, router 12D may receive the Path message from router 12C before receiving the Path message from router 12E. In some embodiments, router 12D may send an initial Path message to router 12B requesting 30 Megabytes of bandwidth on link 22G. When router 12D later receives the Path message from router 12E, router 12D may send an updated Path message to router 12B requesting an additional 20 Megabytes of bandwidth on link 22G, for a total of 50 Megabytes of bandwidth reserved. The updated Path message may not be considered a new Path message, because the updated Path message does not introduce additional state into network 14. Rather, the updated Path message updates existing stored state of router 12B.

In some embodiments, router 12A may compute and select all of the sub-paths to be taken at each of downstream routers 12 within network 14 along the paths to router 12B, rather than each of routers 12C-12F performing the computations and selections on an individual basis. In these embodiments, router 12A may send all of the necessary Path messages to routers 12 within network 14 for reserving the bandwidth for the overall LSP tunnel 16. In other embodiments, a network administrator may pre-compute all of the sub-paths to be taken by all of routers 12 within network 14, and may configure router 12A and/or each of routers 12 with this information. Alternatively, router 12A may instruct the other routers 12 as to which Path messages should be sent for reserving specific amounts of bandwidth on each of the selected sub-paths for the tunnel 16. In this aspect, the other routers 12 may autonomously choose sub-paths.

Figure 3:
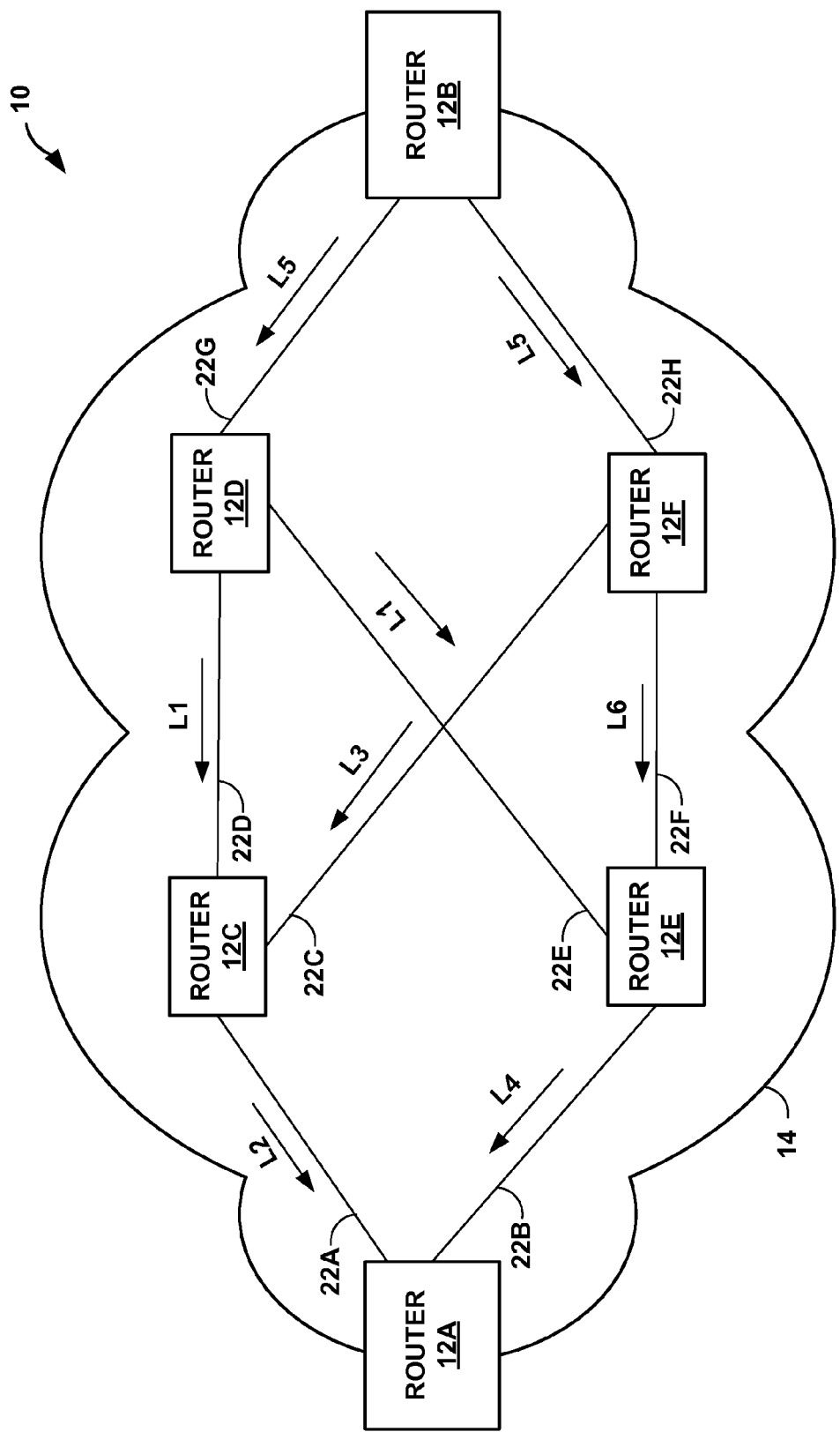
FIG. 3 is a block diagram illustrating example Reservation ("Resv") messages sent by routers within the computer network for establishing the load balancing TE LSP.

FIG. 3 is a block diagram illustrating exemplary labels allocated by routers 12 within the computer network 14 for establishing the load balancing TE LSP tunnel 16. Routers 12 may perform downstream label allocation and communicate the allocated labels by sending RSVP Reservation ("Resv") messages to upstream routers. In the example of FIG. 3, router 12B allocates label L5 for both routers 12D and 12F to use in forwarding network traffic associated with tunnel 16 along the sub-paths that merge at router 12B. Router 12B may communicate the label L5 in a first Resv message to router 12D that indicates that 30 Mb of bandwidth have been reserved on link 22G for tunnel 16. Router 12B also allocates label L5 for router 12F to use in forwarding network traffic associated with tunnel 16. Router 12B may communicate the label L5 in a second Resv message to router 12F that indicates that 20 Mb have been reserved on link 22H for tunnel 16. Router 12B stores forwarding state indicating that upon receiving MPLS packets bearing label L5, to pop the label and forward the un-encapsulated packet to the destination as specified in a header of the un-encapsulated packet. Although shown in FIG. 3 as allocating the same label for both sub-paths 18G and 18H of tunnel 16, router 12B may alternatively allocate different labels for each of the sub-paths sub-paths 18G and 18H of tunnel 16.

Upon receiving the label allocation from router 12B for tunnel 16, router 12D allocates from its internal label space a label to be used for all sub-paths for which it provides a merge point. For example, router 12D allocates label L1 for both routers 12C and 12E for use in forwarding network traffic to router 12D on sub-paths 18D and 18E of tunnel 16. Router 12D may communicate the label L1 to router 12C in a Resv message that indicates that 30 Mb of bandwidth has been reserved on link 22D for tunnel 16. Similarly, router 12D communicates the label L1 (or, alternatively, a different label) to router 12E in a Resv message that indicates that 20 Mb of bandwidth has been reserved on link 22E for tunnel 16. Router 12D stores forwarding state indicating that upon receiving packets bearing label L1, swap the label with L5 and output the packets on an interface associated with link 22G to router 12B.

In some embodiments, a router may be configured to allocate different labels for different sub-paths the overall LSP, rather than allocating the same label as done by router 12D. For example, router 12F may be configured to allocate different labels. In this case, upon receiving the label allocation from router 12B for tunnel 16, router 12F allocates label L3 for router 12C and allocates label L6 for router 12E for use in forwarding network traffic on sub-paths 18C and 18F of tunnel 16. Router 12F communicates label L3 to router 12C in a Resv message that indicates that 30 Mb of bandwidth has been reserved on link 22C for tunnel 16. Similarly, router 12D communicates the label L6 to router 12E in a Resv message that indicates that 20 Mb of bandwidth has been reserved on link 22F for tunnel 16. Router 12F stores forwarding state indicating that upon receiving packets bearing label L3 or L6, to swap the label with L5 and output the packets on an interface associated with link 22H to router 12B.

Upon receiving the label allocations from router 12D and router 12F, router 12C allocates a label L2 for router 12A for use in forwarding network traffic on sub-path 18A of tunnel 16. Router 12C may communicate the label L2 to router 12A in a Resv message that indicates that 60 Mb of bandwidth has been reserved on link 22A for tunnel 16. Router 12C may receive the label allocations from router 12D and router 12F at different times, and may then also allocate the label and bandwidth for sub-path 18A at different times. In this case, router 12C may receive a first Resv message from router 12D, and then send a first Resv message to router 12A that allocates label L2 and indicates that, for example, 30 Mb of bandwidth has been reserved on link 22A for tunnel 16. When router 12C later receives the second Resv message from router 12F, router 12C sends an updated Resv message to router 12A that indicates that 30 additional Mb of bandwidth have been reserved on link 22A for tunnel 16, for a total of 60 Mb of bandwidth. The updated Resv message may not add any additional state into network 14, but may rather simply update existing state of router 12A.

Router 12C stores forwarding state indicating that upon receiving packets bearing label L2, router 12C should load balance the packets evenly across sub-paths 18D and 18C. That is, for fifty percent of the packets received with label L2, swap label L2 with label L1, and output the packets on an interface associated with link 22D to router 12D; and for fifty percent of the packets received with label L2, swap label L2 with label L3, and output the packets on an interface associated with link 22C to router 12F.

Router 12E may operate in a similar manner to allocate label L4 to router 12A for use in forwarding network traffic on sub-path 18B of tunnel 16, and reserve a total of 40 Mb of bandwidth on link 22B for tunnel 16. Router 12E stores forwarding state indicating that upon receiving packets bearing label L4, router 12E should load balance the packets evenly across sub-paths 18E and 18F. That is, for fifty percent of the packets received with label L4, swap label L4 with label L1, and output the packets on an interface associated with link 22E to router 12D; and for fifty percent of the packets received with label L4, swap label L4 with label L6, and output the packets on an interface associated with link 22F to router 12F. The choice of the traffic that is sent to router 12D may be done randomly, or by computing a function (such as a hash) on the label stack, or on fields in the packet headers or contents beyond the label stack, such as an IP or Ethernet header.

Router 12A receives the labels L2 and L4 allocated by routers 12C and 12E, respectively. Router 12A is configured to store forwarding state indicating that upon receiving packets destined for router 12B (or having destination addresses that router 12B has advertised are reachable by router 12B), to encapsulate the packets as MPLS packets carrying labels L2 or L4, i.e., that router 12A should load balance the packets across sub-paths 18A and 18B of tunnel 16 such that sixty percent of the packets receive label L2 and are output on an interface associated with link 22A to router 12C, and forty percent of the packets receive label L4 and are output on an interface associated with link 22B to router 12E. In this way, the overall LSP for tunnel 16 is traffic-engineered using RSVP-TE to include multiple sub-paths 18, in a manner that allows routers 12 to automatically load balance network traffic across the sub-paths 18 of tunnel 16, i.e., an RSVP-TE LSP. Again, router 12A may choose to partition traffic among its downstream routers 12C and 12E randomly or by computing a function on fields in the packet headers.

In accordance with the techniques described in this disclosure, after tunnel 16 is established to extend from ingress router 12A to egress router 12B, router 12A dynamically balances the network traffic across links 22A and 22B, i.e., across sub-paths 18A and 18B of tunnel 16. Router 12A initially receives a packet from another network device (not shown), which router 12A determines is intended for router 12B (e.g., having destination addresses that router 12B has advertised are reachable by router 12B). Router 12A may, for example, receive an IP packet to be admitted to the LSP. Router 12A determines one of links 22A, 22B through which to send the packet. That is, when encapsulating the IP packet and admitting the IP packet into the LSP, router 12A selects one of the set of sub-paths available for the encapsulated MPLS packet.

In one embodiment, to do so, router 12A applies one or more hash functions to the packet. Router 12A may apply the hash function to the IP header of the packet, e.g., the 5-tuple {source IP address, destination IP address, source port number, destination port number, protocol}. Router 12A may maintain a set of bins of the hash function and maps each bin to one of links 22A, 22B. That is, when all or portions of the IP header are applied, the hash function maps packet flows to each of links 22A, 22B. By applying the hash function to the packet header, e.g., the 5-tuple, for a packet of a packet flow, router 12A may achieve load balancing of the packet flows across sub-paths 18A, 18B so that packets of the same packet flow traverse the same sub-path. In this manner, router 10 may ensure in-order delivery of the packets of the packet flow. If router 12A determines that the hash function is mapping packet flows to links 22A, 22B in a manner no longer consistent with the 60/40 bandwidth load balancing requirement, router 12A may dynamically adjust the manner in which the bins of the hash function are mapped to links 22A, 22B to maintain the appropriate load balancing of bandwidth for new packet flows.

In the case of an intermediate router along the LSP, such as router 12C, router 12C may apply the hash function to, for example, the outer MPLS header of the encapsulated packet in combination with the inner IP header of the encapsulated packet. That is, router 12C may do a limited inspection of the packet beneath the MPLS header to apply the hash function. This may allow packets of the same packet flow to be mapped along the same sub-path, even by intermediate devices along the LSP (i.e., devices other than the ingress or egress devices).

Figure 4:
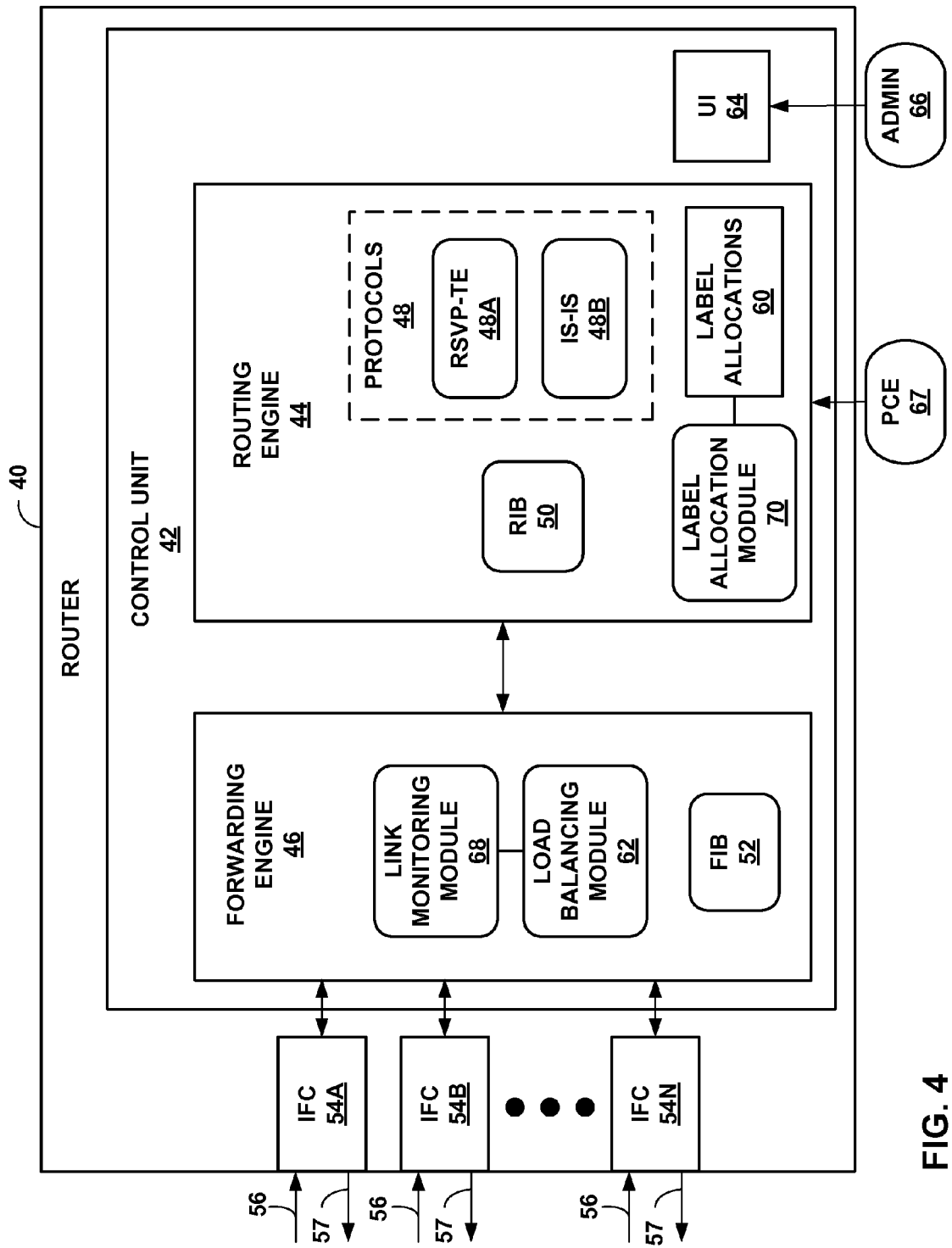
FIG. 4 is a block diagram illustrating an exemplary router capable of supporting RSVP-TE with load balancing extensions in accordance with the techniques described herein.

FIG. 4 is a block diagram illustrating an exemplary router 40 capable of supporting RSVP-TE with load balancing extensions in accordance with the techniques described herein. Router 40 may correspond to any of routers 12 of FIGS. 1-3. Router 40 includes interface cards 54A-54N ("IFCs 54") for receiving packets via input links 56A-56N ("input links 56") and sending packets via output links 57A-57N ("output links 57"). IFCs 54 are interconnected by a high-speed switch (not shown) and links 56, 57. In one example, switch 40 comprises switch fabric, switchgear, a configurable network switch or hub, and the like. Links 56, 57 comprise any form of communication path, such as electrical paths within an integrated circuit, external data busses, optical links, network connections, wireless connections, or other type of communication path. IFCs 54 are coupled to input links 56 and output links 57 via a number of interface ports (not shown).

When router 40 receives a packet via one of input links 56, control unit 42 determines via which of output links 57 to send the packet. Control unit 42 includes routing engine 44 and forwarding engine 46. Routing engine 44 determines one or more routes through a network, e.g., through interconnected devices such as other routers. Control unit 42 provides an operating environment for protocols 48, which are typically implemented as executable software instructions. As illustrated, protocols 48 include RSVP-TE 48A and intermediate system to intermediate system (IS-IS) 48B. Router 40 uses RSVP-TE 48A to set up LSPs. As described herein, RSVP-TE 48A is programmatically extended to allow for establishment of LSPs that include a plurality of sub-paths on which traffic is load balanced between the ingress router and the egress router of the LSPs. Protocols 46 may include other routing protocols in addition to or instead of RSVP-TE 48A and LDP 46B, such as other Multi-protocol Label Switching (MPLS) protocols; or routing protocols, such as the open shortest path first (OSPF), routing information protocol (RIP), border gateway protocol (BGP), interior routing protocols, or other network protocols.

By executing the routing protocols, routing engine 44 identifies existing routes through the network and determines new routes through the network. Routing engine 44 stores routing information in a routing information base (RIB) 50 that includes, for example, known routes through the network. Forwarding engine 46 stores forwarding information base (FIB) 52 that includes destinations of output links 57. FIB 52 may be generated in accordance with RIB 50.

A system administrator ("ADMIN 66") may provide configuration information to router 40 via user interface 64 included within control unit 42. For example, the system administrator may configure router 40 or install software to extend RSVP-TE 48A as described herein. As another example, the system administrator may configure RSVP-TE 48A to traffic-engineer an overall LSP from an ingress router to an egress router. As a further example, a path computation element (PCE) 67 may alternatively or additionally provide configuration information to router 40, e.g., may compute the sub-paths and provide them to router 40.

The extensions to RSVP-TE 48A enable router 40 to calculate multiple sub-paths towards an egress router of an overall RSVP-TE LSP, and to send multiple RSVP Path messages for the overall RSVP-TE LSP to downstream routers along selected ones of the calculated sub-paths. Because the sub-paths are all part of the same overall LSP, router 40 may be required to store less state versus networks that maintain separate LSPs when implementing load balancing. The extensions to RSVP-TE 48A allow RSVP-TE 48A to configure the forwarding engine 46, e.g., load balancing module 62 and link monitoring module 68, to reflect the load-balancing requirements for the overall LSP.

In response to the network administrator initiating set-up of an overall RSVP-TE LSP, router 40 uses the extended RSVP-TE 48A to compute some or all of the available paths to the egress router that satisfy certain constraints on the tunnel imposed by the network administrator. Constraints imposed may include, for example, bandwidth, link color, Shared Risk Link Group (SRLG), and the like. For example, the network administrator may wish to configure an overall LSP that can handle 100 Megabytes of network traffic. RSVP-TE 48A uses constraint information about links within network 14, such as bandwidth availability, to compute the paths. For example, RSVP-TE 48A may use bandwidth availability information accumulated by a link-state interior routing protocol, such as the Intermediate System-Intermediate System (ISIS) protocol or the Open Shortest Path First (OSPF) protocol. RSVP-TE computes multiple paths for which certain constraints, including bandwidth, provide the requisite bandwidth availability in sum.

RSVP-TE 48A generates and sends Path messages for establishing load balancing LSPs (including sub-paths) as described above with reference to FIG. 2. Upon router 40 receiving a Path message from a neighboring router, label allocation module 70 allocates MPLS labels used for establishing the LSPs. Router 40 distributes the labels and reserves bandwidth on links using RSVP-TE 48A to generate Resv messages as described above. Routing engine 44 maintains label allocations 60 which specify how label allocation module 70 has allocated the MPLS labels. For example, label allocations 60 may indicate label bindings to particular forwarding equivalence classes (FECs) associated with LSPs within network 14. Label allocation module 70 may then update FIB 52 of forwarding engine 46 with the labels to be applied when forwarding packets on LSPs.

RSVP-TE 48A may also be extended to recognize modified Path messages and modified Resv messages sent for establishing a load balancing LSP. For example, RSVP-TE 48A may be extended to recognize a received Path message or Resv message as one of a set of messages that collectively are used in the network to establish a "load balancing" TE LSP based on a indicator (e.g., a special field or bit) set in the Path message or Resv message, for example. This special field or bit indicates to the receiving router that other messages received that identify the same LSP are not in error but instead are to be associated with one another as establishing sub-paths for an overall LSP that must satisfy overall constraints, thereby allowing the receiving router to determine whether it is a merge-point or a branch-point for intermediate sub-paths of the load balancing LSP. Router 40 may utilize some of the same mechanisms for establishing load balancing LSPs as are used in establishing P2MP RSVP LSPs. For example, router 40 may advertise its capability in using the extensions to RSVP-TE described herein, to other routers, such as by using RSVP-TE Hello messages. Further details of these mechanisms are described in application Ser. No. 11/508,096, (1014-196US01) entitled "RESOURCE RESERVATION PROTOCOL WITH TRAFFIC ENGINEERING POINT TO MULTI-POINT LABEL SWITCHED PATH HIERARCHY," filed on Aug. 22, 2006, the entire contents of which are incorporated herein by reference.

When router 40 receives packets of a new packet flow, load balancing module 62 of forwarding engine 46 identifies one of output links 57 through which to forward packets of the new packet flow, and also identifies an MPLS label to apply to the packets of the packet flow. After load balancing module 62 has selected one of output links 57 and an MPLS label for a packet flow, forwarding engine 46 forwards all packets of the packet flow along the selected one of output links 57 using the selected MPLS label. Load balancing module 62 may refer to link monitoring module 68 to determine whether network traffic is appropriately allocated across output links 57 before assigning a new packet flow to the one of output links 57.

Where the packet flows are assigned to be forwarded on an RSVP-TE LSP, link monitoring module 68 determines whether output links 57 are loaded with the proper bandwidth allocation, e.g., as configured by RSVP-TE 48A during establishment of the overall RSVP-TE LSP. In one example, link monitoring module 68 determines a bandwidth utilization for each of output links 57. In another example, link monitoring module 68 determines whether a number of packet flows assigned to a particular one of output links 57 has exceeded a threshold. In another example, link monitoring module 68 determines a number of packets per second being sent over each of output links 57. In another example, link monitoring module 68 determines a number of megabytes per second being sent over each of output links 57. In other examples, link monitoring module 68 may utilize a combination of the above-described techniques, or other techniques for determining link congestion. In any case, link monitoring module 68 determines whether usage of output links 57 is consistent with the requirements specified by RSVP-TE 48A for the LSP sub-paths running on the output links 57.

Link monitoring module 68 may also determine when one of the links fails. Link monitoring module 68 communicates with load balancing module 62 to cause load balancing module 62 to update a hash map such that traffic is diverted from the failed link onto other remaining links over which the traffic for the overall RSVP-TE LSP is being load balanced. Load-balancing LSPs may therefore provide improved network resilience, without requiring dedicated links just for failure cases.

Figure 5:
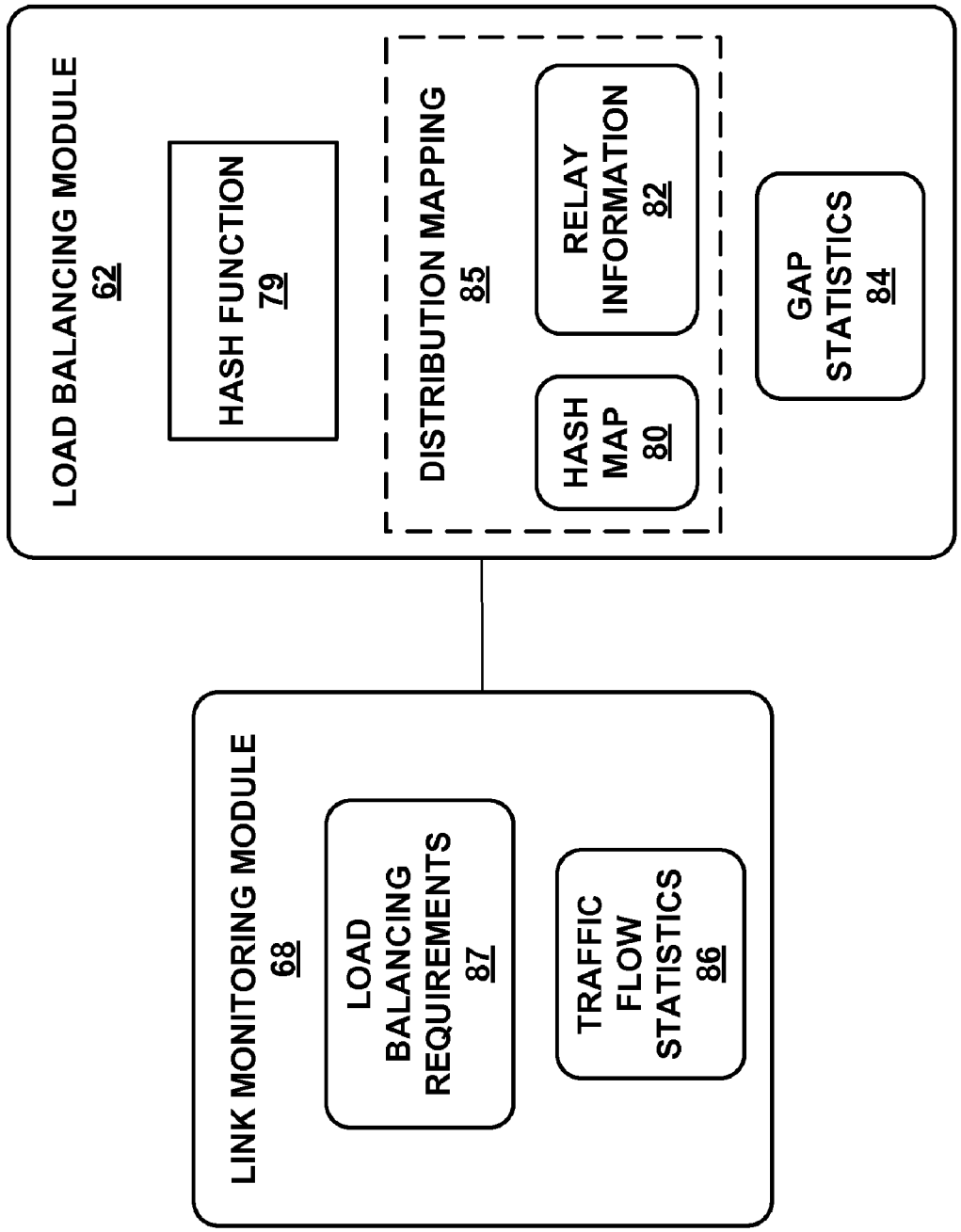
FIG. 5 is a block diagram illustrating an example of a load balancing module and link monitoring module of FIG. 4 in greater detail.
Figure 6:
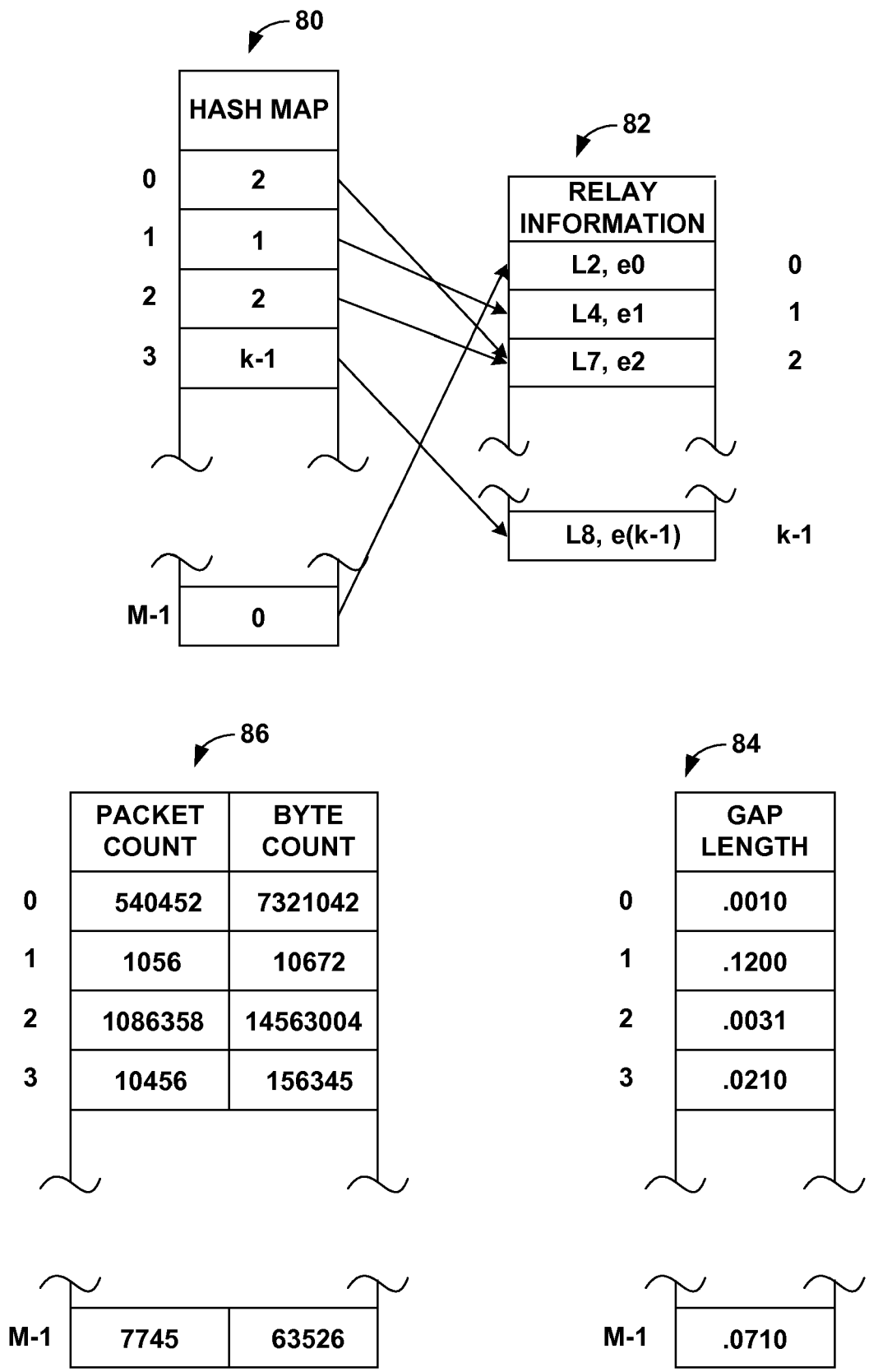
FIG. 6 is a block diagram illustrating exemplary data structures maintained by a load balancing module and a link monitoring module of a router to distribute traffic across sub-paths of an overall RSVP-TE LSP.

As described in greater detail with respect to FIGS. 5 and 6, load balancing module 62 balances packet flows across output links 57 by selecting one of output links 57 to which to assign a new packet flow. In the event router 40 is an ingress to the LSP, upon receiving a new packet flow, load balancing module 62 selects one of output links 57 by applying a hash function to a 5-tuple of a packet header. Load balancing module 62 queries link monitoring module 68 to determine whether the bandwidth utilization of packet flows currently assigned to output links 57 are in keeping with the bandwidth load balancing requirements. If so, load balancing module 62 assigns the new packet flow to the selected one of output links 57. In one example, when link monitoring module 68 determines that the links associated with an overall LSP are not appropriately balanced, load balancing module 62 may select a different link to assign to the new packet flow, and may revise a hash map that maps bins of a hash function to output links 57 to maintain the appropriate load balancing of bandwidth.

In the event router 40 is an intermediate router along the LSP and operates as a branch point for multiple sub-paths of the LSP, router 40 similarly load balances MPLS packets across the sub-paths. In this case, router 40 may apply a hash function to a defined set of data words that follow the label stack of the packet. For example, router 40 may apply a hash function to data words that would correspond to the IP header in the event the MPLS packets encapsulate IP traffic. In this case traffic of the same packet flows would likely be mapped to the same sub-paths as such data words would likely not vary even if the payload of the MPLS packets did not carry IP traffic. In some cases, router 40 may apply signatures and deep packet inspection so as to identify the encapsulated traffic and select appropriate inputs for the hash function from the traffic (e.g., ATM headers, Ethernet headers, IP headers) so as to further assure that packets of the same packet flow are assigned to the same sub-path of the load balancing LSP.

The architecture of router 40 illustrated in FIG. 4 is shown for exemplary purposes only. The invention is not limited to this architecture. In other embodiments, router 40 may be configured in a variety of ways. In one embodiment, for example, some of the functionally of control unit 42 may be distributed within IFCs 54. In another embodiment, control unit 42 may include a routing engine that performs routing functions and maintains routing information base (RIB) 50, and a forwarding engine that performs packet forwarding based on a forwarding information base (FIB) 52, generated in accordance with the RIB 50.

Control unit 42 may be implemented solely in software, or hardware, or may be implemented as a combination of software, hardware, or firmware. For example, control unit 42 may include one or more processors which execute program code in the form of software instructions. In that case, the various software modules of control unit 42 may comprise executable instructions stored on a computer-readable storage medium, such as computer memory or hard disk.

FIG. 5 is a block diagram illustrating an example of load balancing module 62 and link monitoring module 68 of FIG. 4 in greater detail. Load balancing module 62 balances packet flows across output links 57 in accordance with bandwidth reserved for any sub-paths that branch from the router. To perform load balancing, load balancing module 62 selects one of output links 57 of the sub-paths by applying hash function 79 to a packet of a new packet flow. For example, load balancing module 62 applies hash function 79 to a packet header of the packet, such as the 5-tuple {source IP address, destination IP address, source port number, destination port number, protocol}. In the event the router is an intermediate router along the load balancing LSP, load balancing module 62 may apply hash function 79 to certain data words that follow the end of the MPLS label stack of the packet.

Load balancing module 62 determines, when identifying a link for a new packet flow, whether the link identified by hash function 79 is suitable by querying link monitoring module 68 with an identification of the link. For existing packet flows, load balancing module 62 may, in some cases, apply the same hash function 79 to all packets of the packet flow. Alternatively or additionally, to ensure in-order delivery of packets of the packet flow corresponding to the received packet, load balancing module 62 may store an identification of the selected link for the packet flow upon receiving a new packet flow. For example, load balancing module 62 may inspect the packet header to determine whether the packet is a SYN packet. When the packet is a SYN packet, load balancing module 64 determines that the packet corresponds to a new packet flow. When the packet is not a SYN packet, load balancing module 64 forwards the packet to the selected link according to the stored identification.

When load balancing module 62 associates a packet with a particular packet flow, load balancing module 62 may maintain a distribution mapping 85 that associates the hash value of the inbound packet with a next hop and corresponding MPLS label. Distribution mapping 85 may include a hash map 80 that associates the possible hash values with a set of pointers, and relay information 82 that defines a set of forwarding elements and is addressable via the set of pointers. For distributing packets across sub-paths 18, the forwarding elements may define a set of output interfaces and corresponding MPLS labels for the respective next hops along sub-paths 18. In this manner, distribution mapping 85 maps the hash values to MPLS labels and next hops and, more specifically, to output ports of particular sub-paths 18.

Link monitoring module 68 maintains traffic flow statistics 86, which track the amount of traffic associated with each of the hash values. Link monitoring module 68 also maintains load balancing requirements 87 based on network administrator configuration and/or load balancing information received by extended RSVP-TE 48A, such as by Path and Resv messages received. Traffic flow statistics 86 may track traffic flows using a counter for each of the possible hash values. The counter may track the number of packets received for each hash value, the number of bytes received for each hash value or the like. Traffic flow statistics 86 may further track the amount of traffic corresponding to each of the possible next hops. In this manner, traffic flow statistics 86 may track the amount traffic flow of each of sub-paths 18. Link monitoring module 68 compares traffic flow statistics 86 to load balancing requirements 87 and may update distribution mapping 85 to re-distribute the traffic across sub-paths 18 in accordance with load balancing requirements 87.

Load balancing module 62 may further maintain gap statistics 84. Gap statistics 84 may track gaps within hash values using timestamps that indicate the time at which the last packet of a particular hash value was received, counters tracking the amount of time elapsed since the last packet of a particular hash value was received, or the like. Load balancing module 62 may use gap statistics 84 to determine an appropriate time at which to update the distribution of traffic across parallel data paths while maintaining in-sequence delivery of packets. More specifically, load balancing module 62 uses gap statistics 84 to determine the appropriate time to update the mappings of hash values to next hops.

Load balancing module 62 and link monitoring module 68 may arrange distribution mapping 85, hash map 80, relay information 82, traffic flow statistics 86, and gap statistics 84 in the form of a variety of data structures, such as a number of tables, link lists, radix trees, databases, flat files, or other data structures. Furthermore, load balancing module 62 and link monitoring module 68 may store the data structures on one or more computer-readable media, such as a magnetic medium, optical medium, non-volatile random access memory (NVRAM), dynamic random access memory (DRAM), FLASH memory, or the like.

FIG. 6 is a block diagram illustrating exemplary data structures maintained by load balancing module 62 and link monitoring module 68 of router 40 to distribute traffic across sub-paths of an overall RSVP-TE LSP. In the example, hash map 80 comprises a table in which each row represents an association of a hash value to relay information. For each association, hash map 80 includes, for each of the M possible hash values, a pointer to relay information 82.

Relay information 82, as illustrated for exemplary purposes, comprises a table in which each row represents next hops for an associated data path. Relay information 82 includes next hops for each of the possible data paths. Relay information 82 includes k sets of next hops. Ideally, the size (M) of hash map 80 is relatively large compared with the size (k) of relay information 82. For example, M may equal 128 and k may equal 8. In this manner, load balancing module 62 may map more than one hash value to each data path.

In the example of FIG. 6, pointer values stored within the elements of hash map 80 map to indices into relay information 82, as indicated by dashed arrows. For example, the element of hash map 80 corresponding to a hash value 0 stores index 2, which maps hash value 0 to the MPLS label L7 and next hop e2, as stored by relay information 82.

Traffic flow statistics 86 are illustrated as a table in which each row represents traffic flow information for a particular hash value. For each hash value, traffic flow statistics 86 includes the packet count for the hash value and the byte count for the hash value. Traffic flow statistics 86 may maintain information for each of the M possible hash values. Link monitoring module 68 may use traffic flow statistics 86 to maintain the required distribution of packet flows of each hash value across the possible data paths. For example, the traffic flow statistics collected may indicate that the amount of traffic traversing the data path corresponding to next hop e2 is greater than a threshold amount from the desired load balancing requirements specified in load balancing requirements 87.

The packet flows corresponding to the hash value 0 and hash value 2 are mapped to MPLS label L7 and next hop e2. If deemed necessary, in order to decrease the volume of traffic traversing next hop e2, link monitoring module 68 may update the mapping of hash values to particular next hops and labels, e.g., hash value 0 or 2, to a next hop and label associated with a different sub-path along the overall RSVP-TE LSP, such as next hop e1 and label L4.

Gap statistics 84 are illustrated as a table in which each row represents the amount of time elapsed since last receiving a packet with a particular hash value. Each row includes a timing mechanism, such as a timestamp or a counter. Gap statistics 84 may track the amount of time elapsed since receiving a packet, i.e., the gap length, of a particular hash value for each of the M possible hash values. Load balancing module 62 may use gap statistics 84 to maintain in-sequence delivery while updating the mapping of hash values to next hop of data paths. For example, load balancing module 62 may compare the amount of time elapsed since receiving a packet with a particular hash value, i.e., the gap length of the hash value, with a defined threshold gap. Load balancing module 62 may wait until the gap length exceeds the defined threshold gap before updating the mapping.

The data of FIG. 6 is illustrated for exemplary purposes, and may be readily varied. For example, traffic flow statistics 86 may only include packet counts or byte counts, but not both. Further, traffic flow statistics 86 may include counter data for each of the data paths. Relay information 38 may include port information, output interface information, or the like.

Figure 7:
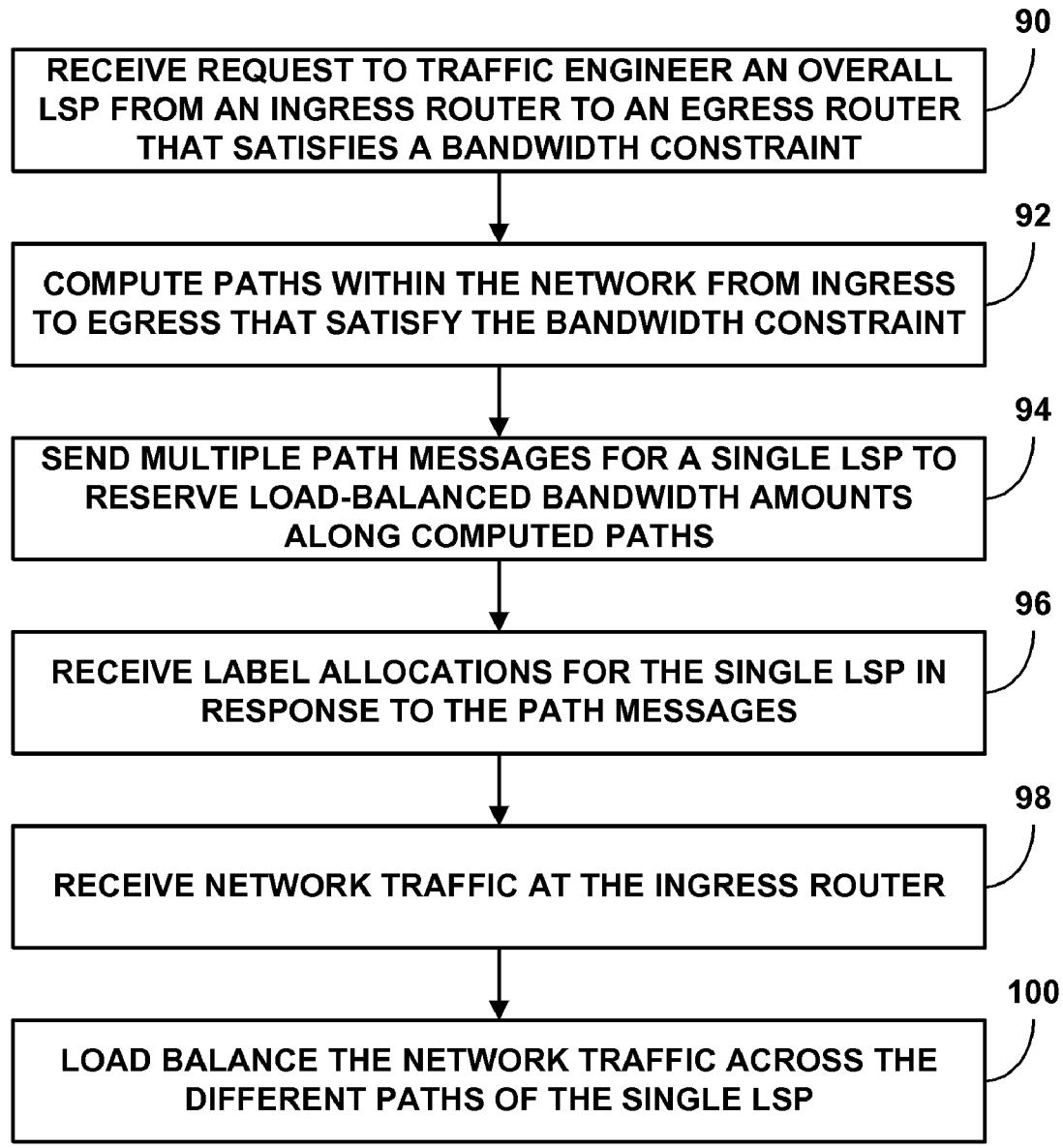
FIG. 7 is a flowchart illustrating exemplary operation of a router in establishing an overall RSVP-TE LSP that includes a plurality of sub-paths from the ingress router to the egress router.

FIG. 7 is a flowchart illustrating exemplary operation of router 40 in establishing an overall RSVP-TE LSP that includes a plurality of sub-paths from the ingress router to the egress router. FIG. 7 will be explained with reference to routers 12 of FIG. 1 and router 40 of FIG. 4. Router 12A may receive a request to traffic-engineer an overall RSVP-TE LSP (e.g., tunnel 16 of FIG. 1) that satisfies certain constraints. For example, a network administrator may configure router 12A with the request (90). Constraints imposed may include, for example, bandwidth, link color, Shared Risk Link Group (SRLG), and the like. For example, the network administrator may wish to configure an overall LSP that can handle 100 Megabytes of network traffic. RSVP-TE 48A uses constraint information about links within network 14, such as bandwidth availability, to compute the paths that satisfy the constraints (92). For example, RSVP-TE 48A may use bandwidth availability information accumulated by a link-state interior routing protocol, such as the Intermediate System-Intermediate System (ISIS) 48B or the Open Shortest Path First (OSPF) protocol. RSVP-TE 48A computes multiple paths for which certain constraints, including bandwidth, provide the requisite bandwidth availability in sum. RSVP-TE 48A may be configured with an upper limit on how many paths can be computed and/or selected.

For each of the selected sub-paths, RSVP-TE 48A generates and sends a Path message associated with the same overall RSVP-TE LSP (94). Router 12A may then receive label advertisements with RSVP-TE 48A via Resv messages in response to the Path messages (96). Router 12A may update relay information 82 to reflect the how the received labels map to next hops. In some cases, such as where router 12A may be an intermediate router along the overall LSP, router 12A may also allocate labels, store the label allocations, distribute the labels, and reserve bandwidth on links using RSVP-TE 48A to generate Resv messages as described above.

Upon receiving network traffic that router 12A determines is destined for egress router 12B (98), load balancing module 62 of router 12A determines one of links 22A, 22B through which to send the packet by applying hash function 79 to the packet header, e.g., the 5-tuple {source IP address, destination IP address, source port number, destination port number, protocol}. Hash function 79 outputs a value, which load balancing module 62 maps to relay information 82 based on hash map 80. Relay information 82 returns an MPLS label to apply to the packets of the packet flow for the network traffic, and a next hop for forwarding the labeled packets.

In this manner, router 12A load balances the packet flows across sub-paths 18A, 18B (100). For example, distribution mapping 85 may map different packet flows to sub-paths 18A or 18B according to the load balancing requirements 87. Link monitoring module 68 may update the hash map 80 if traffic flow statistics 86 indicate that the actual packet flows being mapped are not meeting the load balancing requirements 87 that were set when the overall RSVP-TE LSP was established using the extended RSVP-TE LSP.

Figure 8:
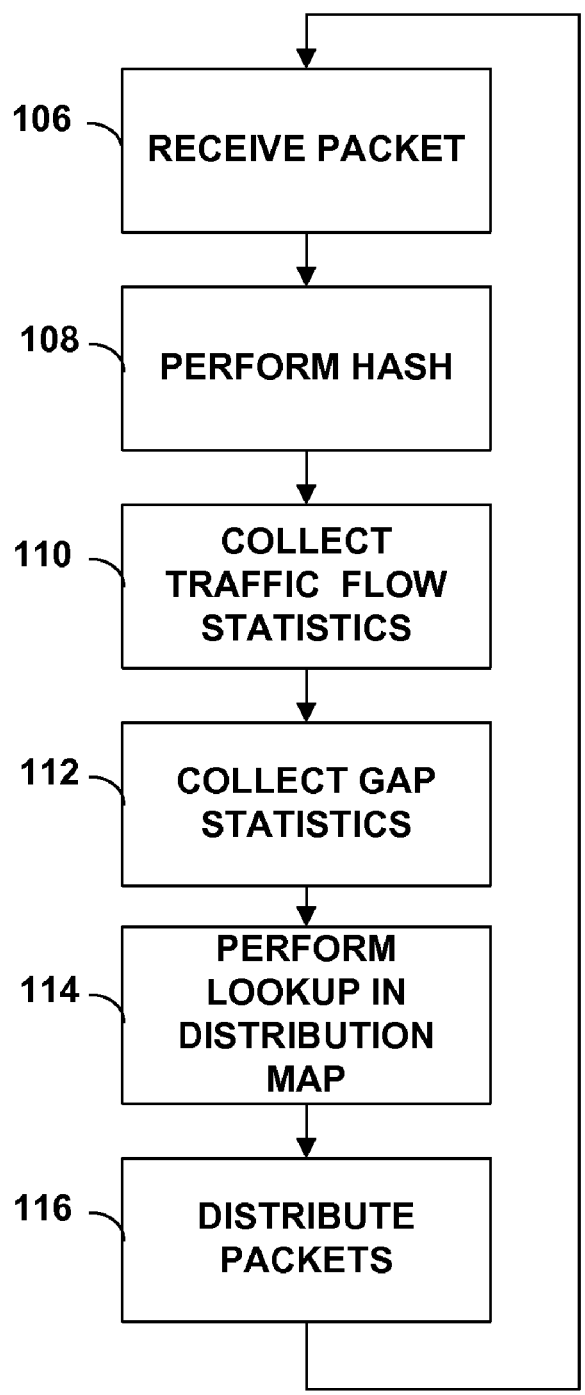
FIG. 8 is a flowchart illustrating an example mode of operation of a router when receiving packets and load balancing the packets across multiple sub-paths of a single overall LSP in accordance with the principles of the invention.

FIG. 8 is a flowchart illustrating an example mode of operation of router 40 when receiving packets and load balancing the packets across multiple sub-paths of a single overall LSP in accordance with the principles of the invention. Initially, router 40 receives an inbound packet from the network via a network link (106). Next, router 40 performs a hash on a key of the inbound packet or, in the event router 40 is an intermediate router along the LSP, on a header extracted from the payload of the MPLS packet (108). The key may include routing information such as the source IP address, destination IP address, protocol type, the source and destination port numbers, the class of service (CoS), the type of service (ToS), as well as any other field in the routing information of the packet that remains constant for any one flow of data from source to destination. The amount of routing information included in the key depends on the desired granularity of the hash. For instance, the more routing information included in the hash the more possible hash values, i.e., the more granular the hash.

Router 40 may further collect traffic flow statistics 86 for each of the hash values (110). Router 40 may collect traffic flow statistics 86 with a set of counters. Router 40 associates at least one counter with each of the hash values. The counters may count the number of packets corresponding to each hash value, the number of bytes corresponding to each hash value, or the like. Further, router 40 may associate at least one counter with each of the sets of next hop of relay information 82. For example, router 40 may collect traffic flow statistics for each hash value with a counter to count the number of packets and a counter to count the number of bytes corresponding to each hash value. Router 40 may concurrently collect traffic flow statistics for each set of next hops, which may correspond to more than one hash value. Router 40 may use traffic flow statistics 86 to update the mapping of hash map 80 in order to load-balance traffic across multiple sub-paths of a single overall LSP consistent with load balancing requirements 87.

Router 40 may further track gap statistics for each hash value (112). Router 40 may use gap statistics 84 to prevent out of sequence delivery of packets while balancing traffic. Router 40 may track gap statistics 84 by associating a timestamp with each of the hash values. The timestamp may indicate the time at which the last packet with the particular hash value was received. For example, upon identifying the hash value of the packet, router 40 may set a timestamp associated with the hash value. Alternatively, router 40 may track gap statistics 84 with a set of counters. Router 40 may associate at least one counter with each of the hash values. Whenever router 40 receives a packet, the counter associated with the hash value of the packet may be set to a fixed value, and periodically incremented by a specified increment value. For example, when router 40 receives a packet, the counter associated with the hash value of the packet may be set to 0 and the increment value may be set to 1 millisecond. In this manner, the counter may track the amount of time that has elapsed since a packet with the particular hash value was received.

Router 40 performs a look up in distribution mapping 85 to map the calculated hash value for the packet to one of a set of next hops and MPLS labels in accordance with relay information 82 (114). Router 40 applies the MPLS label and forwards the packet to a corresponding output interface for the identified next hop (116).

Figure 9:
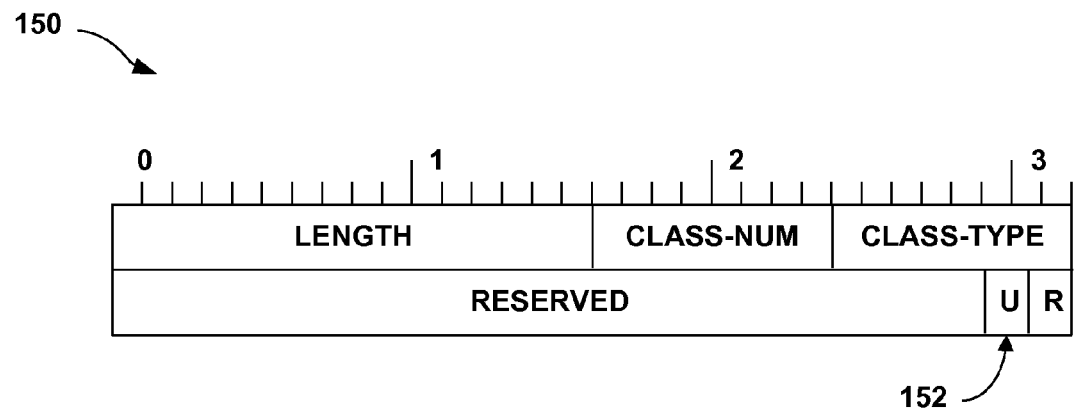
FIG. 9 illustrates an exemplary RSVP-TE Capability object used to indicate whether a router supports load balancing RSVP-TE LSPs.

FIG. 9 illustrates an exemplary RSVP-TE Capability object 150 used to indicate whether a router supports load-balancing RSVP-TE LSPs. In some embodiments, capability object 150 may be carried within RSVP-TE Hello messages sent from a router to neighboring routers in a network and indicates a set of capabilities supported by the router. In other embodiments, Capability object 150 may be carried within RSVP-TE Path messages or RSVP-TE Resv messages to indicate that the Path messages or Resv messages are to be used for establishing a load balancing RSVP-TE LSP. Capability object 150 includes a length field, a class-number field, a class-type field (set equal to class-type 1), a reserved field, and an R flag that indicates support for RecoveryPath Srefresh. In accordance with the invention, a new flag, U flag 152, is defined in the Capability object 150 to indicate that a router supports load-balancing RSVP-TE LSPs and/or that the message that contains the Capability object 150 is to be used for establishing a load balancing RSVP-TE LSP.

The usage of RSVP-TE Hello messages for exchanging load-balancing RSVP-TE LSP capability implies that a router may exchange RSVP-TE Hellos with a neighboring router before sending or receiving any other RSVP-TE messages with that neighboring router. In some cases, a router may not send Path messages for establishing an overall load-balancing RSVP-TE LSP to routers along the overall LSP unless the sending router knows that at least some of the other routers support load-balancing RSVP-TE LSPs. U flag 52 within Capability object 50 provides a mechanism for routers to advertise load-balancing RSVP-TE LSP capability to neighboring routers in a network.

The load-balancing RSVP-TE LSP capable U flag 52 comprises 1 bit. When U flag 52 is set (U=1), the router is capable of both sending modified Path messages and modified Resv messages and receiving modified Path messages and modified Resv messages. When U flag 52 is not set (U=0), the router is not capable of either distributing or receiving modified Path or Resv messages. The reserved bits are be set to zero on transmission and ignored on receipt.

Figure 10:
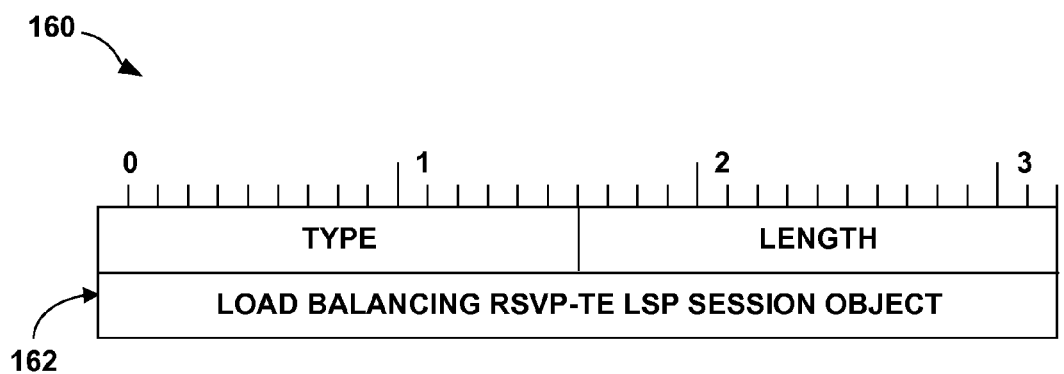
FIG. 10 illustrates an exemplary type-length-value (TLV) of an RSVP-TE object that signals a Tunnel Identifier.

FIG. 10 illustrates an exemplary type-length-value (TLV) of an RSVP-TE object that signals a Tunnel Identifier. A router may transmit an MPLS packet to a router along the overall load-balancing LSP by encapsulating the MPLS packet in an IP tunnel or a MPLS tunnel. In this case, the receiving router may determine that the MPLS packet is associated with a load-balancing LSP based on the tunnel on which the router receives the packet. The TLV illustrated in FIG. 10 provides a mechanism for the sending router to inform the receiving router that the sending router will use a particular tunnel for transmitting MPLS packets for load-balancing RSVP-TE LSPs.

When using RSVP-TE for establishing load-balancing RSVP-TE LSPs, the IF_ID RSVP_HOP object may be used to signal the Tunnel Identifier. If the sending router uses an IP or MPLS tunnel to transmit MPLS packets for a load-balancing RSVP-TE LSP to the receiving router, the sending router includes the IF_ID RSVP_HOP object in Path messages and Resv messages, possibly in addition to the RSVP-TE Capability object 150 of FIG. 9. The TLV value acts as the Tunnel Identifier.

FIG. 10 illustrates an exemplary Load Balancing RSVP-TE LSP TLV 160 in the IF_ID RSVP_HOP object. Load Balancing RSVP-TE LSP TLV 60 includes a type field, a length field, and a value field 162 that acts as the Tunnel Identifier. In this case, value field 162 comprises the Load Balancing RSVP-TE Session Object and loptionally the Sender Template Object. The TLV value field 162 identifies the load-balancing RSVP-TE LSP.

The techniques described herein may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described herein may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various embodiments of the invention have been described. These and other embodiments are within the scope of the following claims.

The invention claimed is:

1. A method for traffic-engineering an overall label switched path (LSP) across a network from an ingress device to an egress device, comprising:

computing for the overall LSP a plurality of sub-paths to the egress device that satisfy a set of traffic-engineering constraints;

sending resource reservation requests to label-switching routers (LSRs) along two or more of the plurality of sub-paths of the overall LSP, wherein the resource reservation requests include an identifier associating the requests with the same overall LSP, and wherein the resource reservation requests each include an indicator specifying the requested overall LSP as a load-balancing LSP;

receiving resource reservation messages in response to the resource reservation requests that specify reserved resources and labels allocated to the overall LSP to be used for forwarding network traffic to corresponding next hops along the sub-paths of the overall LSP, wherein the resource reservation messages include an identifier associating the messages with the same overall LSP, and wherein the resource reservation messages each include an indicator specifying the overall LSP as a load-balancing LSP;

configuring a forwarding plane of the ingress device to store the labels and corresponding next hops for the sub-paths of the overall LSP;

configuring the forwarding plane with load balancing requirements that specify how network traffic is to be load-balanced across the sub-paths of the overall LSP;

receiving network traffic at the ingress device of the overall LSP;

in the forwarding plane of the ingress device, load balancing the network traffic across the sub-paths by selecting from among the stored labels and corresponding next hops for forwarding the network traffic in accordance with load balancing requirements; and forwarding the network traffic with the selected labels onto sub-paths of the overall LSP.

2. The method of claim 1, wherein computing the plurality of sub-paths comprises computing the plurality of sub-paths at the ingress device.

3. The method of claim 1, wherein computing the plurality of sub-paths comprises computing the plurality of sub-paths at the each of the LSRs of the overall LSP.

4. The method of claim 1, wherein the network traffic comprises packets associated with a plurality of packet flows destined for the egress device of the overall LSP, wherein load balancing the network traffic across the sub-paths comprises applying flow-level load balancing to the received network traffic.

5. The method of claim 1, wherein load balancing the network traffic comprises applying a hash function to a portion of a packet of the network traffic, and accessing a hash map based on the hash function to determine a Multiprotocol Label Switching (MPLS) label to apply to the packet and an output interface from which to output the packet.

6. The method of claim 1, further comprising load balancing the network traffic across the sub-paths without re-ordering packets in packet flows of the network traffic.

7. The method of claim 1, wherein the traffic engineering constraints comprise one or more of bandwidth, link color, and Shared Risk Link Group (SRLG).

8. The method of claim 1, further comprising enforcing a maximum number of the computed sub-paths for which resource reservation requests are sent from a given LSR.

9. The method of claim 1, wherein the resource reservation requests comprise extended RSVP-TE Path messages, and wherein the extended RSVP-TE Path messages each comprise the identifier of the overall LSP, and wherein the indicator is a load-balancing bit or field that identifies the overall LSP as a load-balancing LSP.

10. The method of claim 1, further comprising:
evaluating traffic statistics to determine whether the sub-paths are being utilized consistent with configured traffic-engineering requirements of the overall LSP, and
dynamically updating a hash map to correct inconsistencies with respect to the configured traffic-engineering requirements.

11. The method of claim 1, wherein the overall LSP comprises a unicast LSP.

12. The method of claim 1, further comprising:
detecting a network failure; and
upon detecting the network failure, dynamically updating a hash map to re-balance network traffic across the sub-paths.

13. The method of claim 1,
wherein the overall LSP extends across a network from the ingress device to a plurality of egress devices, and
wherein computing for the LSP a plurality of sub-paths to the egress device that satisfy a set of traffic-engineering constraints comprises computing for the LSP a plurality of sub-paths to each of the plurality of egress devices.

14. The method of claim 13, wherein the overall LSP comprises a unicast LSP.

15. The method of claim 13, wherein the overall LSP comprises a load-balancing point-to-multipoint LSP for load-balancing multicast traffic, and wherein one or more of the plurality of sub-paths comprises a point-to-multipoint sub-path.

16. A router comprising:
a control unit configured to execute a resource reservation protocol for traffic-engineering an overall label switched path (LSP) across a network from an ingress device to an egress device, wherein the resource reservation protocol is configured to compute for the overall LSP a plurality of alternate sub-paths to the egress device that satisfy the set of traffic-engineering constraints;

a physical interface configured to send resource reservation requests generated by the resource reservation protocol to label-switching routers (LSRs) along two or more of the plurality of sub-paths of the overall LSP, wherein the resource reservation requests include an identifier associating the requests with the same overall LSP, and wherein the resource reservation requests each include an indicator specifying the requested overall LSP as a load-balancing LSP, and receive resource reservation messages in response to the resource reservation requests that specify reserved resources and labels allocated to the overall LSP to be used for forwarding network traffic to corresponding next hops along the sub-paths of the overall LSP, wherein the resource reservation messages include an identifier associating the messages with the same overall LSP, and wherein the resource reservation messages each include an indicator specifying the overall LSP as a load-balancing LSP;

a forwarding plane configured to store the labels and corresponding next hops for the sub-paths of the overall LSP, wherein the resource reservation protocol configures the forwarding plane with load balancing requirements that specify how network traffic is to be load-balanced across the sub-paths of the overall LSP; and a load balancing module executing on the forwarding plane, wherein the load balancing module is configured to load balance the network traffic across the sub-paths by selecting from among the stored labels and corresponding next hops for forwarding the network traffic in accordance with load balancing requirements, and wherein the physical interface is configured to forward the network traffic with the selected labels onto sub-paths of the overall LSP.

17. The router of claim 16, wherein the load balancing module is configured to apply a hash function to a portion of a packet of the network traffic, and access a hash map based on the hash function to determine a Multiprotocol Label Switching (MPLS) label to apply to the packet and an output interface from which to output the packet.

18. The router of claim 16, wherein the load balancing module is configured to apply flow-level load balancing to packets associated with a plurality of packet flows received by the physical interface to load balance the packet flows across the sub-paths.

19. The router of claim 18, wherein the load balancing module is configured to load balance the packets of the packet flows across the sub-paths without re-ordering packets in the packet flows.

20. The router of claim 16, wherein the traffic engineering constraints comprise one or more of bandwidth, link color, and Shared Risk Link Group (SRLG).

21. The router of claim 16, wherein the resource reservation protocol is configured to enforce a maximum number of the computed sub-paths for which resource reservation requests are sent.

22. The router of claim 16, wherein the Path messages and the resource reservation messages each comprise extended RSVP-TE messages, and wherein the extended RSVP-TE messages each comprise the identifier of the overall LSP, and wherein the indicator is a load-balancing bit or field that identifies the overall LSP as a load-balancing LSP.

23. The router of claim 16, further comprising a link monitoring module that evaluates traffic statistics associated with each of a plurality of links of the router to determine whether the sub-paths associated with the links are being utilized consistent with configured traffic-engineering requirements of the overall LSP,
wherein the load balancing module dynamically updates a hash map to correct inconsistencies with respect to the configured traffic-engineering requirements based on the evaluation by the link monitoring module.

24. The router of claim 16, wherein the resource reservation protocol comprises an extended Resource Reservation Protocol with Traffic Engineering Extensions (RSVP-TE).

25. The router of claim 16, wherein the overall LSP comprises a unicast LSP.

26. The router of claim 16,
wherein the overall LSP extends across a network from the ingress device to a plurality of egress devices, and
wherein the resource reservation protocol is configured to compute for the LSP a plurality of sub-paths to each of the plurality of egress devices.

27. The router of claim 26, wherein the overall LSP comprises a load-balancing point-to-multipoint LSP for load-balancing multicast traffic, and wherein one or more of the plurality of sub-paths comprises a point-to-multipoint sub-path.

28. A non-transitory computer-readable storage medium comprising instructions for causing a programmable processor to:
execute a resource reservation protocol for traffic-engineering an overall label switched path (LSP) across a network from an ingress device to an egress device;
compute for the overall LSP a plurality of alternate sub-paths to the egress device that satisfy a set of traffic-engineering constraints;
send resource reservation requests to label-switching routers (LSRs) along two or more of the plurality of sub-paths of the overall LSP, wherein the resource reservation requests include an identifier associating the requests with the same overall LSP, and wherein the resource reservation requests each include an indicator specifying the requested overall LSP as a load-balancing LSP;
receive resource reservation messages in response to the resource reservation requests that specify reserved resources and labels allocated to the overall LSP to be used for forwarding network traffic to corresponding next hops along the sub-paths of the overall LSP, wherein the resource reservation messages include an identifier associating the messages with the same overall LSP, and wherein the resource reservation messages each include an indicator specifying the overall LSP as a load-balancing LSP;
configure a forwarding plane of a network device to store the labels and corresponding next hops for the sub-paths of the overall LSP; and
configure the forwarding plane to apply flow-level load balancing to the received network traffic to load balance the packet flows across the sub-paths of the overall LSP by selecting from among the stored labels and corresponding next hops for forwarding the packet flows in accordance with load balancing requirements.

* * * * *